United States Patent [19]

Huber et al.

[11] 4,415,255
[45] Nov. 15, 1983

[54] OPTICAL COPYING ARRANGEMENT

[75] Inventors: Hans-Peter Huber, Munich; Erich Burger, Unterhaching; Horst Bickl, Pullach, all of Fed. Rep. of Germany

[73] Assignee: AGFA-Gevaert AG, Leverkusen, Fed. Rep. of Germany

[21] Appl. No.: 342,171

[22] Filed: Jan. 25, 1982

[30] Foreign Application Priority Data

Jan. 24, 1981 [DE] Fed. Rep. of Germany ....... 3102293

[51] Int. Cl.³ .................................................. G03G 15/00
[52] U.S. Cl. ...................................... 355/3 R; 355/8; 355/75
[58] Field of Search ............... 355/8, 3 R, 1 X, 14 R, 355/133, 75; D16/27-32

[56] References Cited

U.S. PATENT DOCUMENTS 3,656,848  4/1972  Bentzman ............................. 355/8
4,068,950  1/1978  Kito ..................................... 355/8 X Primary Examiner—R. L. Moses
Attorney, Agent, or Firm—Michael J. Striker

[57] ABSTRACT

An optical copying arrangement, particularly an electrostatic copying arrangement, has a carriage provided with a transparent supporting plate for an original and movable in a substantially horizontal direction, a drive for moving an image carrier onto which an image is to be copied from the original, and a scanning system arranged to scan the original supported on the supporting plate by successive strips and form a copy on the image carrier, wherein the supporting plate has a part which in initial position of the carriage is located prior to a first strip, considered in direction of carriage movement, and is bent downwardly relative to the main part of the supporting plate.

16 Claims, 3 Drawing Figures

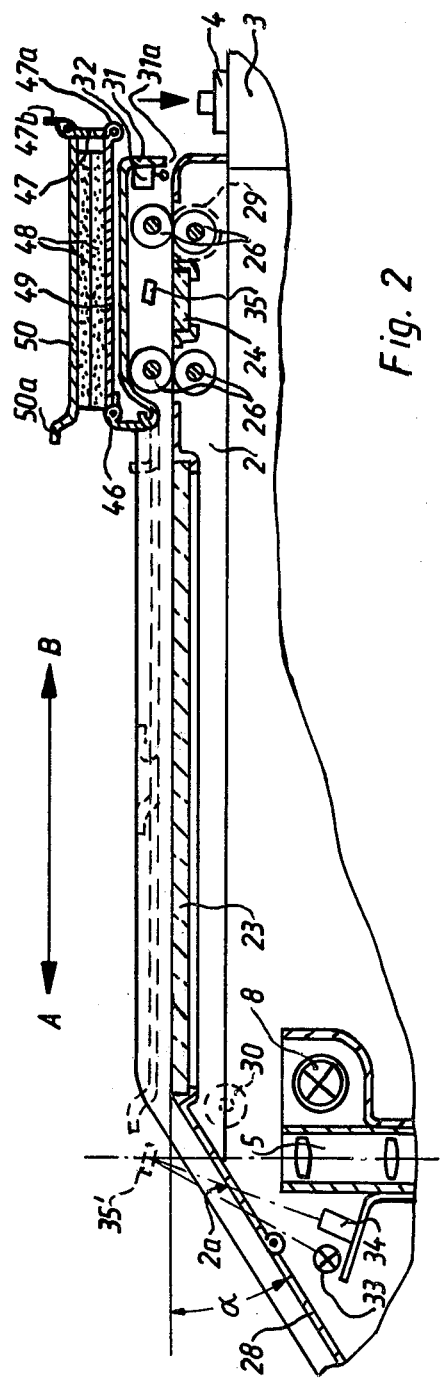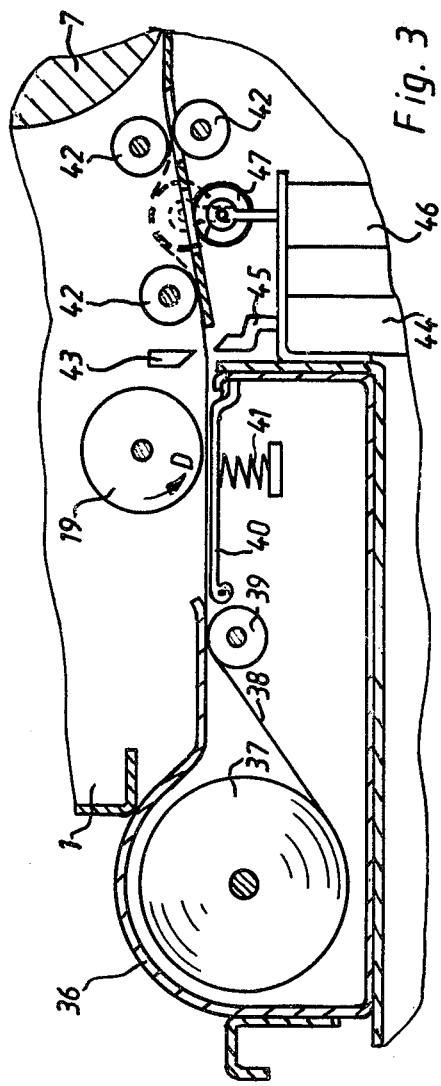

OPTICAL COPYING ARRANGEMENT

BACKGROUND OF THE INVENTION

The present invention relates to an optical copying arrangement, particularly an electrostatic copying arrangement.

Copying arrangements of the above mentioned general type are known in the art. In a known copying arrangement, a carriage having a transparent supporting plate for an original moves in a substantially horizontal direction, and the original having a long side and a small side is copied with the aid of a scanning system by strips on a simultaneously moved image recording member. Such an arrangement is disclosed, for example, in the German Offenlegungsschrift No. 2,654,319. It has the advantage that it provides for a simple and compact construction. Despite the great light intensity which is attained by the scanning system, the maximum copying speed, however, is limited because in the event of high copying speeds the original, which lies on the carriage, can be shaken by an accelerating force which, first of all, takes place during the beginning of the copying process. This particularly takes place in the event that booklets or books must be copied.

SUMMARY OF THE INVENTION

Accordingly, it is an object of the present invention to provide an optical copying arrangement which avoids the disadvantages of the prior art.

More particularly, it is an object of the present invention to provide an optical copying arrangement which makes possible a higher copying speed.

In keeping with these objects, and with others which will become apparent hereinafter, one feature of the present invention resides, briefly stated, in an optical copying arrangement which has a carriage provided with a transparent supporting plate for an original and movable in a substantially horizontal direction, means for moving an image carrier onto which an image is to be copied from the original, simultaneously with the carriage, and a scanning system arranged to scan the original supported on the supporting plate by successive strips and form a copy on the image carrier wherein the supporting member has a part which in initial position of the carriage is located prior to a first strip, as considered in direction of movement of the carriage, and is bent downwardly relative to the remaining part of the supporting plate.

When the optical copying arrangement is designed in accordance with the present invention, a booklet or book is secured against displacement by the desk-shaped supporting surface for a part of original which is not to be immediately copied. During braking of the carriage, lifting of this part from its supporting face can take place for a short time. Since the braking is performed first after termination of the copying process, the copying process cannot be undesirably affected. Moreover, during the return running of the carriage and the new braking, the original is again pulled against its desk-shaped supporting face or to its initial position required for a new copying. Individual sheet originals can be easily secured against displacement by a suitable abutment edge. One or multi-sheet originals which are not formed as books, for example detached originals, can be secured to a plane position by a pressing plate closable in the direction of movement.

A further increase of the copying speed without increasing accelerating forces acting upon the carriage is attained when the original supporting face or plate is arranged with its longitudinal side transverse to the direction of movement of the carriage. This provides for, for example in the event of the DIN-format in the comparable conditions, an increase of the speed by substantially 40%. At the same time, the longitudinal dimension of the arrangement is reduced both in its stack part and running, as well as in its delivery part, by a respective magnitude. This leads to considerably reduced entire dimensions in this direction, whereas the transverse direction of the arrangement is increased only relatively insignificantly. This increase in the transverse direction is possible with the scanning system without increase of the distance between the plane of the original and the plane of the image recording member, which is sufficient because of relatively high light intensity with the asymmetrical illumination arrangement provided in advantageous manner so as to have space for the angled carriage.

The transverse position of this format makes possible, in connection with a further image window provided on the carriage and the respective original transport device, the copying of the next-greater standard format with the same copying arrangement. It also makes possible, in connection with a cassette for an endless image carrier, to make copies of arbitrarily long originals, such as computer print-outs, flowcharts, etc.

Finally, it is also possible, because of the cover hingedly arranged at the end of the carriage and the operating field provided centrally of the arrangement, to reach the arrangement in any orientation and thereby to operate it by right-handed and left-handed persons without difficulties.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 2 is a section of a carriage with an open cover of the inventive copying arrangement; and FIG. 3 is a view showing a section of a paper cassette for a band-like image carrier of the inventive copying arrangement.

DESCRIPTION OF THE PREFERRED EMBODIMENTS

Figure 1:
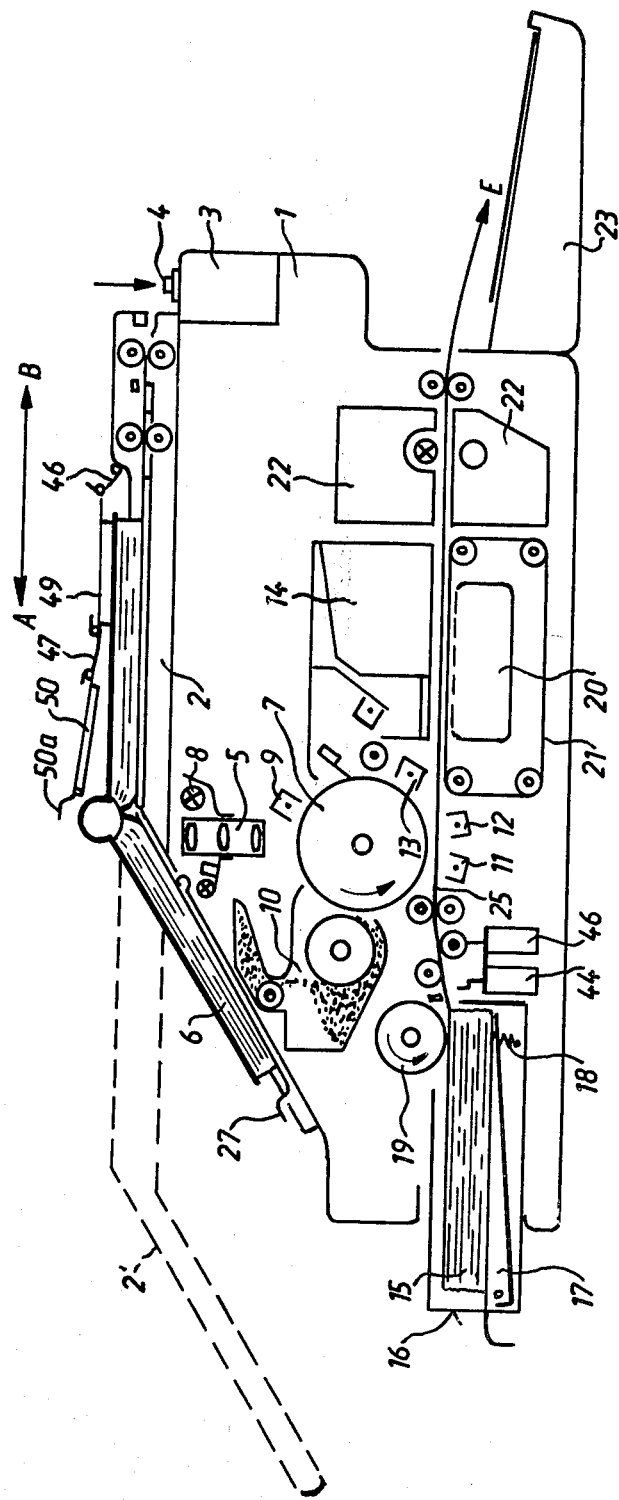
FIG. 1 is a view showing a section of a copying arrangement in accordance with the present invention, in a semi-schematic manner.

A copying arrangement in accordance with the present invention has a housing identified by reference numeral 1 and a carriage 2 which is supported on the housing 1 movable in longitudinal direction A-B.

The drive of the carriage 2 is connected, in a known manner, with the aid of magnetic clutches or the like, with the drive of the arrangement, wherein the clutches are controlled by a central control unit 3 in dependence upon the actuation of a copying switch 4 in correspondence with the respective copying cycle.

During the movement of the carriage in the direction A, a picture or image of an original supported on the carriage 2 is illuminated by a scanning system 5 in direction of the arrow C onto a rotary image recording cylinder 7. The illumination of the original 6 is carried out by a fluorescent or phosphorescent pipe 8. Prior to the illumination point, the image recording cylinder 7 is uniformly charged by a corona discharge device 9. An electrostatic latent image or picture produced by the illumination is developed by a developing device 10, in the shown example a magnetic developing device, and subsequently transferred by a transfer corona 11, to a final image carrier. After the transfer point, a transfer corona 12, a cleaning coron 13, and a cleaning device 14 are arranged.

The supply of the sheet-like image carrier 25 is carried out from a sheet stack 15 which is arranged in a paper cassette 16 insertable into the housing 1. The sheet stack 15 rests on a pivotable plate 17 and is pressed by a pressure spring 18 against a contact roller 19. The contact roller 19 is actuated by a control unit 3 periodically in correspondence with the copying cycle.

After the transfer of the powder image, the image carrier which is withdrawn from the image recording cylinder 7 by the withdrawing corona 12 is transported by a transporting belt 21 combined with suction boxes 20 to a fixing device 22 which, in the shown example, is a flash fixing device, and finally it is placed in direction of the arrow E onto a delivery table 51.

As can be seen particularly from FIG. 2, the horizontal upper surface of the carriage 2 receives a transparent supporting plate 23 which has dimensions corresponding to the dimensions of the original to be copied. The small side of the original is visible in this Figure. At the rear end of the carriage 2, as considered in the running direction A, the carriage 2 carries a further transparent supporting plate 24 which corresponds in its elongation to the strip-shaped image window of the scanning system 5. Transporting rollers 26 are arranged at both sides of the supporting plate 24 and can transport a sheet-like original over the supporting plate 24.

The transporting rollers 26 are connected with one another by a not shown transmission so that all rollers rotate in the same direction and with the same speed. A gear 29 sits on the roller shaft and engages with a drive gear 30 in such a position of the carriage 2 in which the transparent supporting plate 24 is in registry with the image window of the scanning system 5. In this position, which can be selected by the control unit 3, any long originals can be transported over the image window and projected by the scanning system 5 onto the image recording cylinder 7.

The horizontal part of the carriage 2 is connected with a desk-shaped band-supporting part 2a which encloses an angle α relative to the transparent supporting plate 23. This supporting part 2a serves for supporting a portion of a book-shaped original 6, which does not take part in the copying process. For making accessible structural elements located below the supporting part 2a, such as magnetic printing mechanism 10, the supporting part 2a has a closing flap 28 provided with a handle 27. The outermost position of the carriage in the running direction A is shown by a broken line 2'.

When a book lies with its back on the edge between two parts of the supporting plate, the supporting plate reliably supports the book against displacement because of the desk-shaped construction of the supporting plate, during travel of the carriage. Braking at the end of the copying process can lead to a displacement of the book which, however, does not negatively affect the copying process. Since during the return of the carriage vibrating again takes place at its end, the book original in each case is again displaced back to its supporting position. When the speed of the carriage is so increased that the thus produced acceleration force can lead to displacement of the original on the supporting plate 23, this does not have disadvantageous action upon the copying quality, inasmuch as the original is retained in engagement in the beginning of the copying process. For individual sheet originals, a respective abutment edge for providing an engagement with the original on the supporting plate can be formed.

For copying originals of large dimensions or copying endless originals, the carriage 2 is brought by its drive, controlled by the control unit 3, into such a position in which the transparent supporting plate 24 is in register with the image window of the scanning system 5. In this position, as mentioned above, the drive gear 29 of the original transporting roller 26 engages with the driving gear 30 of the arrangement. After insertion of a sheet-like or band-like original into an insertion slot 31a, the covers 31 of the carriage 2 brings into action the rollers 26 by a paper sensor 32 and thereby the original is transported over the transparent supporting plate 24. The illumination window formed by the transparent supporting plate 24 is provided at its rear edge, as considered in direction of transportation A, with a light barrier which includes an emitter 33, for example an infrared light source, and a receiver 34. The active paths of rays between the emitter 33 and receiver 34 is produced by a mirror 35 arranged on the carriage 2 above the movement path of the original transported over the image window 24. In the above mentioned position of the carriage, the mirror 35 assumes a position which is shown in broken lines and lies in the paths of rays of the emitter 33 and the receiver 34. During passage of the original between the mirror, on the one hand, and the emitter and receiver, on the other hand, the paths of rays of the light barrier is interrupted. The light barrier 33-34 stops the transport process with respective delay, as soon as the rear edge of the original passes the illumination window.

The paper sensor 32 and the light barrier 33-35 control further, via the control unit 3, also the drive for the image recording cylinder 7 and the transport and the cutting device for the finished image carrier. In the case of endless originals, a band-like image carrier 38 is utilized which is taken from a cassette 36 for a rolling material. The cassette 36 is insertable into the housing 1 instead of the cassette 16. It contains a winding-off roller 36 for the band-like image carrier 38. The band-like image carrier 38 is supplied from the winding-off roller 37 via a deviating roller 39 to a pivotable supporting plate 40 which is arranged under the action of a pressure spring 41. The pressure spring 41 presses the image carrier which is pulled over the supporting plate 40, against a contact roller 19, the latter pulls the image carrier in direction of the arrow D from the winding-off roller 37, and transports the same to paper transporting rollers 42 provided after the cassette.

At the end of the cassette 36, a cutting device for the band-like image carrier 38 is arranged. The cutting device includes a stationary cutter 43 and a movable cutter 45 actuated by a magnet 44. For preventing interruption of the image carrier 38 during the cutting process behind this cutting point for the treating step, image transferring step, and image fixing step, a roller 47 is provided and actuated by a magnet 46 so that before the cut a certain band length is wound off from the winding-off roller 37. This band length can be brought during the cutting process so as to retain the uniform band running in the subsequent treatment stages. Naturally, instead of this, a known helically wound rotary cutter can be utilized which forms a cut on the running paper web.

For producing endless copies, such as for example from computer print-outs, the respectively greater supporting plate 23 is provided. For providing the possibility to alternately copy also short formats with the utilization of the rolling material, the control unit is so programmed that the shortest separable band piece can bridge the gap between two successive transport devices.

Finally, the cover is hingedly connected on the cover 31 of the carriage 2 and composed of two hinge-like parts 46 and 47 and two cover parts 49 and 50 padded with foam material plate 48. The cover 46-50 is closable in the running direction A of the carriage 2. In open condition, it can be folded so that it only insignificantly overlaps the rear part of the carriage 2 and thereby does not cover the field of the operating bottom arranged centrally on the arrangement. A handle 50a is provided on the part 50. The hinged parts 46 and 47 carry abutments 46a, 47a and 47b which prevent that in the opening direction the parts 46 and 49 are turned relative to one another by an angle more than 90°, and the parts 47, 49 and 50 turn relative to one another by an angle more than 0°. Thereby, folding of the cover shown in the drawing can be carried out with one hand.

It will be understood that each of the elements described above, or two or more together, may also find a useful application in other types of constructions differing from the types described above.

While the invention has been illustrated and described as embodied in an optical copying arrangement, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An optical copying arrangement, particularly an electrostatic copying arrangement, comprising a carriage provided with a supporting plate having an essentially transparent portion for an original having long and short sides, and being movable in a substantially horizontal direction, parallel to the short sides; means for moving an image carrier onto which an image is to be copied from the original, simultaneously with said carriage, a scanning system arranged to scan the original supported on said supporting plate by successive strips and form a copy on the image carrier, said supporting plate having a further part which in initial position of said carriage is located prior to a first strip, as considered in direction of movement of said carriage, and is bent downwardly relative to said transparent portion of said supporting plate in direction of movement for providing support for a portion of the original which is not copied so as to avoid displacement of the original on the transparent portion upon movement of said carriage.

2. An optical copying arrangement as defined in claim 1, wherein said transparent portion of said supporting plate is substantially horizontal and has a longer side extending transverse to the direction of movement of said carriage.

3. An optical copying arrangement as defined in claim 1, wherein said carriage has a rear end facing away from said bent part of said supporting plate; and further comprising at said rear end a cover which is closable in the direction of movement of said carriage and is hingedly connected with the latter.

4. An optical copying arrangement as defined in claim 1, wherein said carriage has a rear end facing away from said bent part of said supporting plate; and further comprising a housing, and an actuating field arranged at said rear end of said carriage substantially centrally of said housing.

5. An optical copying arrangement as defined in claim 1; and further comprising machine elements located under said bent part of said supporting plate, said bent part of said supporting plate having a movable flap portion arranged for allowing access to said machine elements.

6. An optical copying arrangement as defined in claim 1, wherein said scanning means includes system for obtaining an electrostatic latent copy on an intermediate image recording member and transferring the image produced on said image recording member to a sheet-like or band-like image carrier.

7. An optical copying arrangement as defined in claim 6; and further comprising a first paper cassette arranged to accommodate a stack of paper forming said sheet-like carrier and to supply the same for obtaining a copy thereon.

8. An optical copying arrangement, particularly an electrostatic copying arrangement, comprising a carriage provided with a supporting plate having an essentially transparent portion for an original having long and short sides, and being movable in a substantially horizontal direction paralel to the short sides; means for moving an image carrier onto which an image is to be copied from the original, simultaneously with said carriage; a scanning system arranged to scan the original supported on said supporting plate by successive strips and form a copy on the image carrier, said supporting plate having a further part which in initial the position of said carriage is located prior to a first strip, as considered in direction of movement of said carriage, and is bent downwardly relative to the transparent portion of said supporting plate in the direction of movement for providing support for a portion of the original which is not copied so as to avoid displacement of the original on the transparent portion upon movement of said carriage, wherein said carriage has a rear end facing away from said bent part of said supporting plate; and further comprising at said rear end a cover which is closable in the direction of movement of said carriage and is hingedly connected with the latter, said cover being foldable so that it does not substantially overlap said rear end of said carriage.

9. An optical copying arrangement, particularly an electrostatic copying arrangement, comprising a carriage provided with a supporting plate having an essentially transparent portion for an original having long and short, and being movable in a substantially horizontal direction, parallel to the short sides; means for moving an image carrier into which an image is to be copied from the original, simultaneously with said carriage; a scanning system arranged to scan the original supported on said supporting plate by successive strips and form a copy on the image carrier, said supporting plate having a further part which in initial position of said carriage is located prior to a first strip, as considered in direction of movement of said carriage, and is bent downwardly relative to the transparent portion of said supporting plate in direction of movement for providing support for a portion of the original which is not copied so as to avoid displacement of the original on the transparent portion upon movement of said carriage, wherein said scanning system has an image field, said transparent portion of the supporting plate determining a first image window; and further comprising a second image window with a shape and dimensions corresponding to those of one copying strip, and means for moving said carriage and arranged so that said moving means provides for at least one immovable position of said carriage in which said second image window is in registry with said image field of said scanning system.

10. An optical copying arrangement as defined in claim 9; and further comprising a driving member, and a pair of transporting rollers for transporting a sheet-like or band-like original and having a roller drive member, said roller drive member of said transporting rollers engaging with said driving member in the respective position of said carriage.

11. An optical copying arrangement as defined in claim 9; wherein said second image window has an edge; and further comprising a light barrier provided at said edge of said second image window and arranged for sensing a running out end of the original, and cutting means arranged for cutting the band-like image carrier and controlled by said light barrier.

12. An optical copying arrangement as defined in claim 11, wherein the original has a predetermined movement path determined by the movement of said carriage, said light barrier including a light emitter and a light receiver with predetermined paths of rays, and also a mirror which connects the paths of rays of said light emitter and light receiver and is arranged on said carriage at is side which is opposite to said light emitter and light receiver relative to said path of the original.

13. An optical copying arrangement, particularly an electrostatic copying arrangement, comprising a carriage provided with a supporting plate having an essentially transparent portion for an original having long and short sides, and being movable in a substantially horizontal direction, parallel to the short sides; means for moving an image carrier onto which an image is to be copied from the original, simultaneously with said carriage; a scanning system arranged to scan the original supported on said supporting plate by successive strips and form a copy on the image carrier, said supporting plate having a further part which in initial position of said carriage is located prior to a first strip, as considered in direction of movement of said carriage, and is bent downwardly relative to the transparent portion of said supporting plate in direction of movement for providing support for a portion of the original which is not copied so as to avoid displacement of the original on the transparent portion upon movement of said carriage, wherein said scanning system includes means for obtaining an electrostatic latent copy on an intermediate image recording member and transferring the image produced on said image recording member to a sheet-like or band-like image carrier, and further comprising a first paper cassette arranged to accommodate a stack of paper forming said sheet-like carrier and to supply the same for obtaining a copy thereon and a second cassette arranged to replace said first cassette and including a winding-off roller for the band-like image carrier.

14. An optical copying arrangement as defined in claim 13; and further comprising cutting means arranged for cutting the band-like carrier, and control means for controlling the operation of said cutting means.

15. An optical copying arrangement as defined in claim 13, wherein said second cassette has a supporting part for supporting the band-like image carrier; and further comprising a rubber roller arranged to act upon an upper sheet of paper of the stack of the sheet-like carriers in said first-mentioned cassette, and also upon the band-like image carrier pulled onto said supporting part of said further cassette.

16. An optical copying arrangement, particularly an electrostatic copying arrangement, comprising a carriage provided with a supporting plate having an essentially transparent portion for an original having long and short sides, and being movable in a substantially horizontal direction, parallel to the short sides; means for moving an image carrier onto which an image is to be copied from the original, simultaneously with said carriage; a scanning system arranged to scan the original supported on said supporting plate by successive strips and form a copy on the image carrier, said supporting plate having a further part which in initial position of said carriage is located prior to a first strip, as considered in direction of movement of said carriage, and is bent downwardly relative to the transparent portion, of said supporting plate in the direction of movement for providing support for a portion of the original which is not copied so as to avoid displacement of the original on the transparent portion upon movement of said carriage, and further comprising a transporting roller for transporting a band-like image carrier, cutting means for cutting the band-like image carrier, and a detaching roller located between said transporting roller and said cutting means and arranged so that prior to cutting step it pulls a predetermined length of the band-like image carrier, to provide for uniform transport of the latter.

* * * * *